United States Patent Office.

ARTHUR SMITH, OF BROCKLEY, COUNTY OF KENT, ENGLAND.

REFINING COCOANUT-OIL.

SPECIFICATION forming part of Letters Patent No. 432,251, dated July 15, 1890.

Application filed May 24, 1890. Serial No. 353,030. (No specimens.) Patented in England March 5, 1887, No. 3,410.

*To all whom it may concern:*

Be it known that I, ARTHUR SMITH, a citizen of England, residing at 90 Wickham Road, Brockley, in the county of Kent, England, have invented a new and useful Process for Deodorizing Cocoanut-Oil, (for which I have obtained a patent in Great Britain, dated March 5, 1887, No. 3,410,) of which the following is a specification.

My invention relates to a process for deodorizing cocoanut-oil. For this purpose I, in the first instance, mix with the crude oil an aqueous solution of an alkaline sulphide in the proportion of from three to five pounds of the sulphide to a hundred-weight of the oil, the solution employed being such as to have a specific gravity of about 1.050. The sulphide may be that of sodium, potassium, or ammonium, or it may be any of those sometimes called "hydrosulphurets," which are produced by passing sulphureted hydrogen through solutions of the caustic alkalies or through alkaline earths dissolved or suspended in water. I boil the mixture of the oil and sulphide solution under agitation for about an hour. This may be done by passing steam through the mixture, or it may be done in a steam-jacketed vessel, the agitation being effected either by stirring or by blowing air through the material. After boiling, the material is allowed to settle, and the clear fat is run off and washed with water and steam. After drawing off the wash-water, the material is boiled for about an hour with a solution of a bisulphite, by preference bisulphite of soda, using about two pounds dissolved in a gallon of water. After boiling and settling, the product is finally washed with water and steam, and then it will be found to be entirely deprived of smell and taste. The proportions of the agents may be varied, according to the quality of the material treated. Thus oil of a rancid character will require to be treated with a stronger solution of sulphide than that of a more fresh quality.

Having thus described the nature of my invention and the best means I know of carrying the same into practical effect, I claim—

The herein-described process for deodorizing cocoanut-oil by boiling with a sulphide, washing, boiling again with a bisulphite, and washing.

In testimony whereof I have signed my name to this specification, in the presence of two subscribing witnesses, this 13th day of May, A. D. 1890.

ARTHUR SMITH.

Witnesses:
    OLIVER IMRAY,
*Patent Agent, 28 Southampton Buildings, London, W. C.*
    JNO. P. M. MILLARD,
*Clerk to Messrs. Abel & Imray, Consulting Engineers and Patent Agents, 28 Southampton Buildings, London, W. C.*